US007308291B2

(12) United States Patent
Kenoun et al.

(10) Patent No.: US 7,308,291 B2
(45) Date of Patent: Dec. 11, 2007

(54) ANTENNA FOR SENDING AND RECEIVING SIGNALS IN A PLURALITY OF FREQUENCY BANDS

(75) Inventors: Robert Kenoun, Palatine, IL (US); McKay R. Johnson, Chicago, IL (US)

(73) Assignee: Motorola Inc., Schaumburg, IL (US)

( * ) Notice: Subject to any disclaimer, the term of this patent is extended or adjusted under 35 U.S.C. 154(b) by 436 days.

(21) Appl. No.: 11/013,008

(22) Filed: Dec. 15, 2004

(65) Prior Publication Data

US 2006/0128333 A1 Jun. 15, 2006

(51) Int. Cl.
*H04B 1/38* (2006.01)

(52) U.S. Cl. .................................... 455/575.7; 343/702

(58) Field of Classification Search ..................... None
See application file for complete search history.

(56) References Cited

U.S. PATENT DOCUMENTS 7,030,833 B2 * 4/2006 Ohara et al. ................ 343/867
7,148,849 B2 * 12/2006 Lin ..................... 343/700 MS
7,164,933 B1 * 1/2007 Steigerwald et al. ..... 455/562.1
2003/0189522 A1 10/2003 Zeilinger

* cited by examiner

*Primary Examiner*—Thanh Cong Le
(74) *Attorney, Agent, or Firm*—Sylvia Chen

(57) ABSTRACT

An antenna (400) for sending and receiving signals in a plurality of frequency bands generates a plurality of resonances in the plurality of frequency bands and includes a first radiating element (402) that generates a first resonance in a first frequency band, a second radiating element (404), coupled to and extending at an angle from the first radiating element (402), that generates a second resonance in the first frequency band, and a third radiating element (406), coupled to and extended at an angle from the first radiating element (402). A capacitive coupling between the second radiating element (404) and the third radiating element (406) generates a loop with a third resonance in the first frequency band, and the third radiating element (406) generates a fourth resonance in a second frequency band independent of the loop at the second frequency band.

15 Claims, 10 Drawing Sheets

ANTENNA FOR SENDING AND RECEIVING SIGNALS IN A PLURALITY OF FREQUENCY BANDS

FIELD OF THE INVENTION

This invention relates in general to wireless communication systems, and more specifically to a apparatus and system for sending and receiving signals in a wireless communication system.

BACKGROUND OF THE INVENTION

When wireless communication devices such as mobile phones were first developed, most of them used analog signal transmission systems and therefore needed to operate only in the Analog Mobile Phone System (AMPS) band. Over the past few years, several developments have taken place in the field of wireless communication systems. A variety of digital transmission schemes have been developed to enable efficient and enhanced transmission of data over the wireless medium. Further, the size of wireless devices, including mobile phones, has reduced considerably.

To cater to the increasing utilization of the wireless medium, the radio frequency spectrum is divided into various segments, so that certain frequency bands are devoted to specific services. For example, separate frequency bands have been devoted to mobile phone traffic, satellite communication, radio communication and television signal communication.

With the advent of several digital transmission schemes in wireless devices, several frequency bands are being utilized for communication. These bands are separated and are utilized for different communication applications or schemes. Exemplary bands include the Global System for Mobile Communications (GSM) band, and the Universal Mobile Telecommunications System (UMTS) band. These bands offer certain advantages, and it is desirable to utilize wireless devices that operate reliably within these bands. In order to operate mobile phones reliably in these bands, antennas are required that may be precisely tuned to operate in the desired frequency band.

Conventional antennas that enable the precise operation of wireless devices such as mobile phones in the desired bands are typically external antennas that fit outside the body of the mobile phone. These are not popular with consumers. Further, these antennas only operate in a few frequency bands.

BRIEF DESCRIPTION OF THE DRAWINGS

The accompanying figures, where like reference numerals refer to identical or functionally similar elements throughout the separate views. These, together with the detailed description below, are incorporated in and form part of the specification, and serve to further illustrate the embodiments and explain various principles and advantages, in accordance with the present invention.

DETAILED DESCRIPTION PREFERRED EMBODIMENTS

In an embodiment, an antenna for sending and receiving signals in a plurality of frequency bands is disclosed. The antenna generates a plurality of resonances in the plurality of frequency bands. It includes a first set of radiating elements that generate at least one resonance in a first frequency band, and a second set of radiating elements that generate at least one resonance in a second frequency band. In the antenna, at least one resonance is generated in a loop that exists between at least two radiating elements belonging to a combination of the first and second sets of radiating elements.

This disclosure is provided to further explain in an enabling manner the best modes of making and using various embodiments, in accordance with the present invention. The disclosure is also given to enhance the perception and appreciation of the inventive principles and advantages thereof, rather than to limit in any manner the invention. The invention is defined solely by the appended claims, including any amendments made during the pendency of this application and all equivalents of the claims, as issued.

It is further understood that the use of relational terms, if any, such as first and second, top and bottom, and the like, are used solely to distinguish one entity or action from another, without necessarily requiring or implying any actual relationship or order between such entities or actions.

Figure 1:
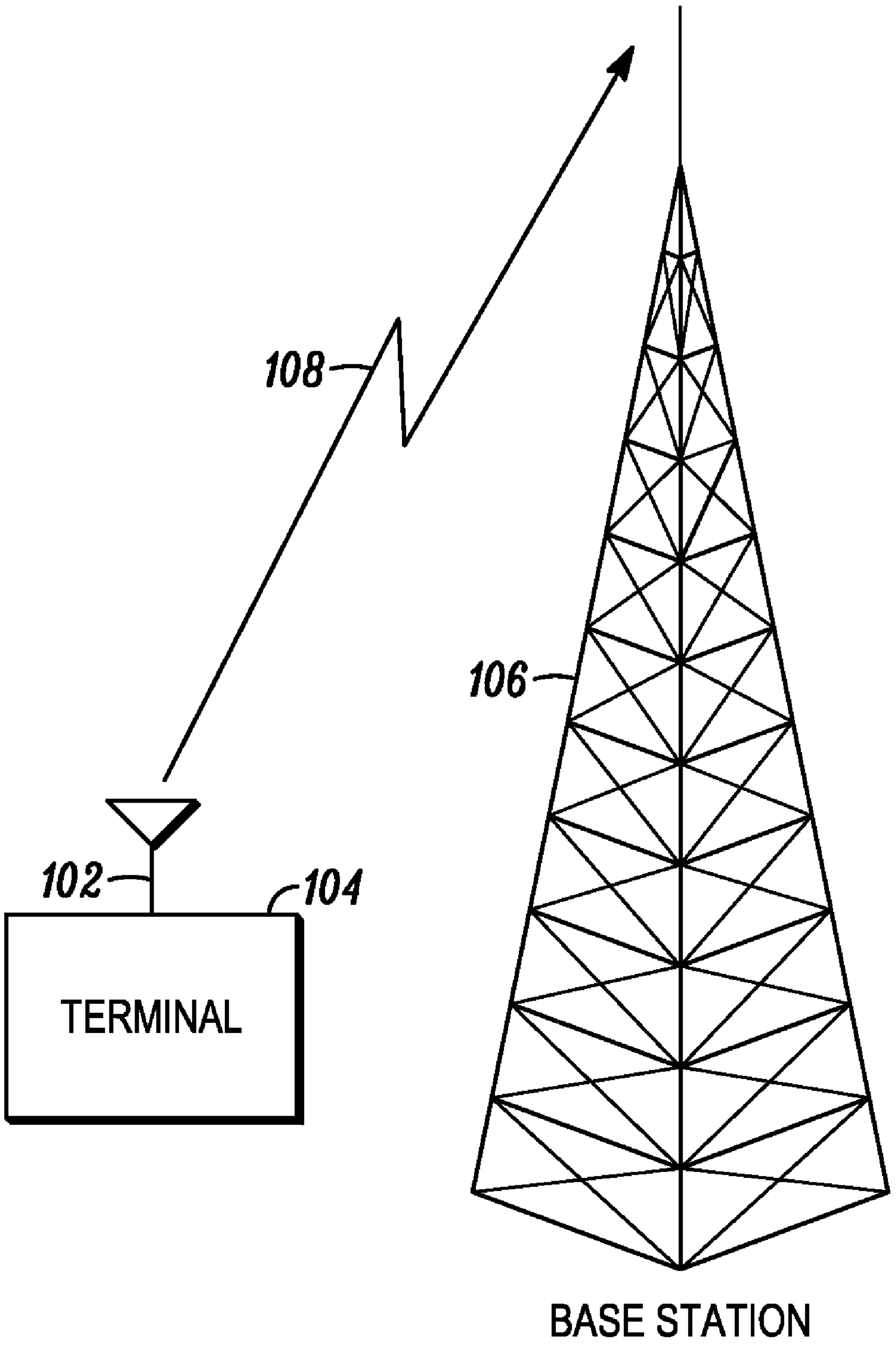
FIG. 1 is a block diagram illustrating communications between a terminal and a base station.

FIG. 1 depicts a block diagram for communications between a terminal and base station. As shown in FIG. 1, an antenna 102 is provided with a terminal 104, which communicates with a base station 106 over a wireless medium. The communication between the terminal 104 and the base station 106 is enabled through a channel 108. The terminal 104 receives and sends signals via the channel 108 through the antenna 102, which operates in certain frequency bands. The antenna 102 may be an internal or external antenna. The antenna 102 includes a plurality of radiating elements that generate suitable resonances in desired frequency bands and enable transmission and reception of signals. The resonances are described in detail, in conjunction with FIG. 6.

A plurality of resonances is set up in a plurality of frequency bands. The plurality of resonances enables transmission and reception of signals in the plurality of frequency bands. In an embodiment of the present invention, resonances are set in each of a first and second frequency bands by using a loop formed by a pair of radiating elements. The pair of radiating elements may include one or more radiating elements from either a first or a second set of radiating elements. The first and the second set of radiating elements are described in detail in conjunction with FIG. 3. The loop includes two radiating elements from the first and second set of radiating elements, including the coupling capacitance between them.

In an embodiment, the first frequency band includes a high-frequency GSM band and the second frequency band a low-frequency GSM band or AMPS band. In another embodiment, the first frequency band includes a UMTS band and the second frequency band includes a low-frequency GSM band. In yet another embodiment, the first frequency band includes the high-frequency GSM band as well as the UMTS band and the second frequency band includes a low-frequency GSM band or AMPS bands.

Figure 2:
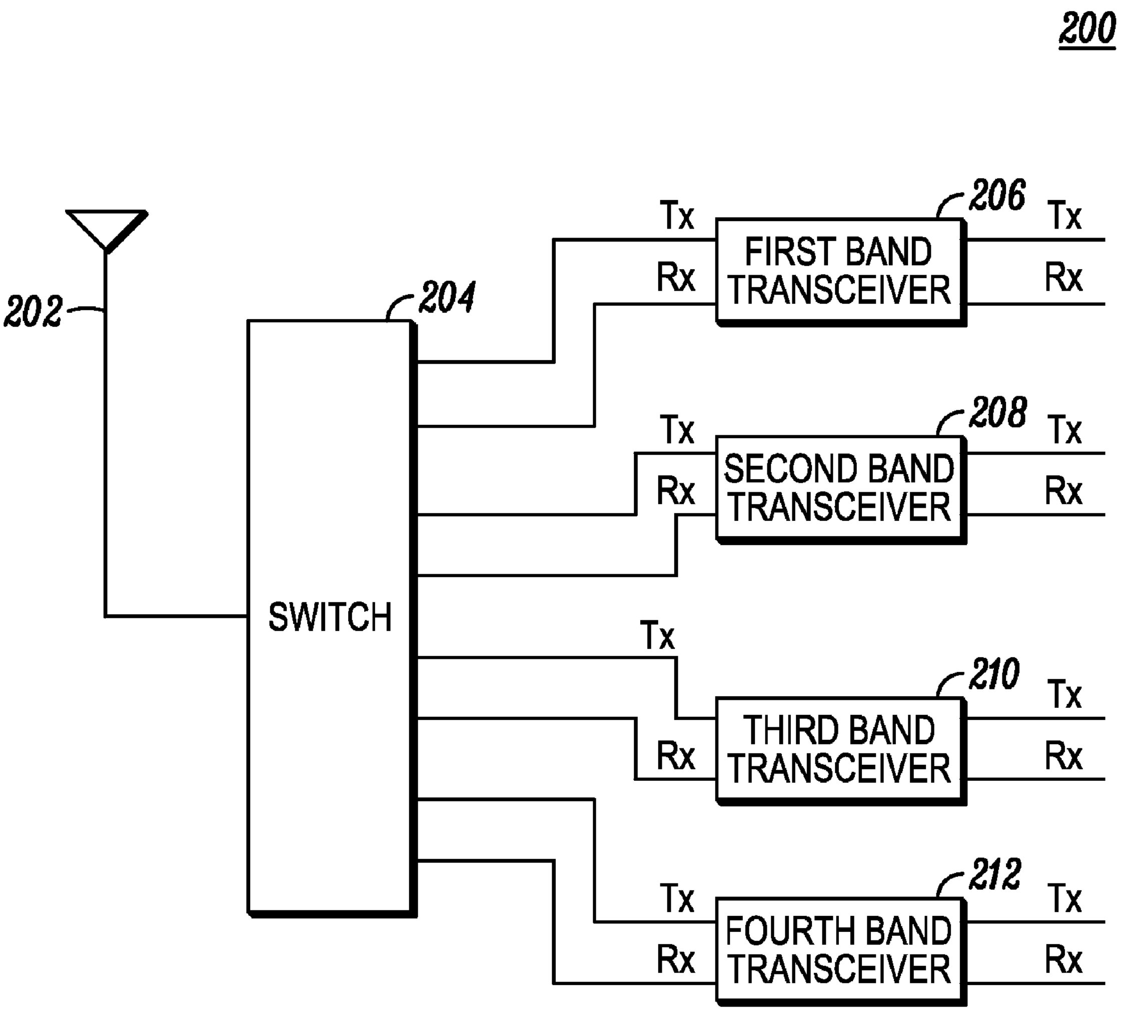
FIG. 2 is a block diagram illustrating the system setup for band-selection, in accordance with an exemplary embodiment of the present invention.

FIG. 2 is a block diagram illustrating the system setup for band-selection, in accordance with an exemplary embodiment of the present invention. A system 200 includes an antenna 202 and a switch 204. The switch 204 does the setup and selection of frequency bands, to send and receive signals. The switch 204 is a component inside a front-end module that includes a large switching mechanism for the functioning of the wireless device that utilizes the antenna 202.

The transceivers for sending and receiving signals in different bands are first band transceiver 206, second band transceiver 208, third band transceiver 210, and fourth band transceiver 212. The second band transceiver 208, the third band transceiver 210, and the fourth band transceiver 212 transmit and receive in sub-bands of the first frequency band as will be shown in FIG. 6. The first band transceiver 206 transmits and receives in the second frequency band as will be shown in FIG. 6. For sending and receiving signals in a particular band, the switch 204 selects the required transmission and reception lines, i.e., Tx/Rx lines connecting one of the first band transceiver 206, second band transceiver 208, third band transceiver 210, or fourth band transceiver 212, to antenna 202.

Figure 3:
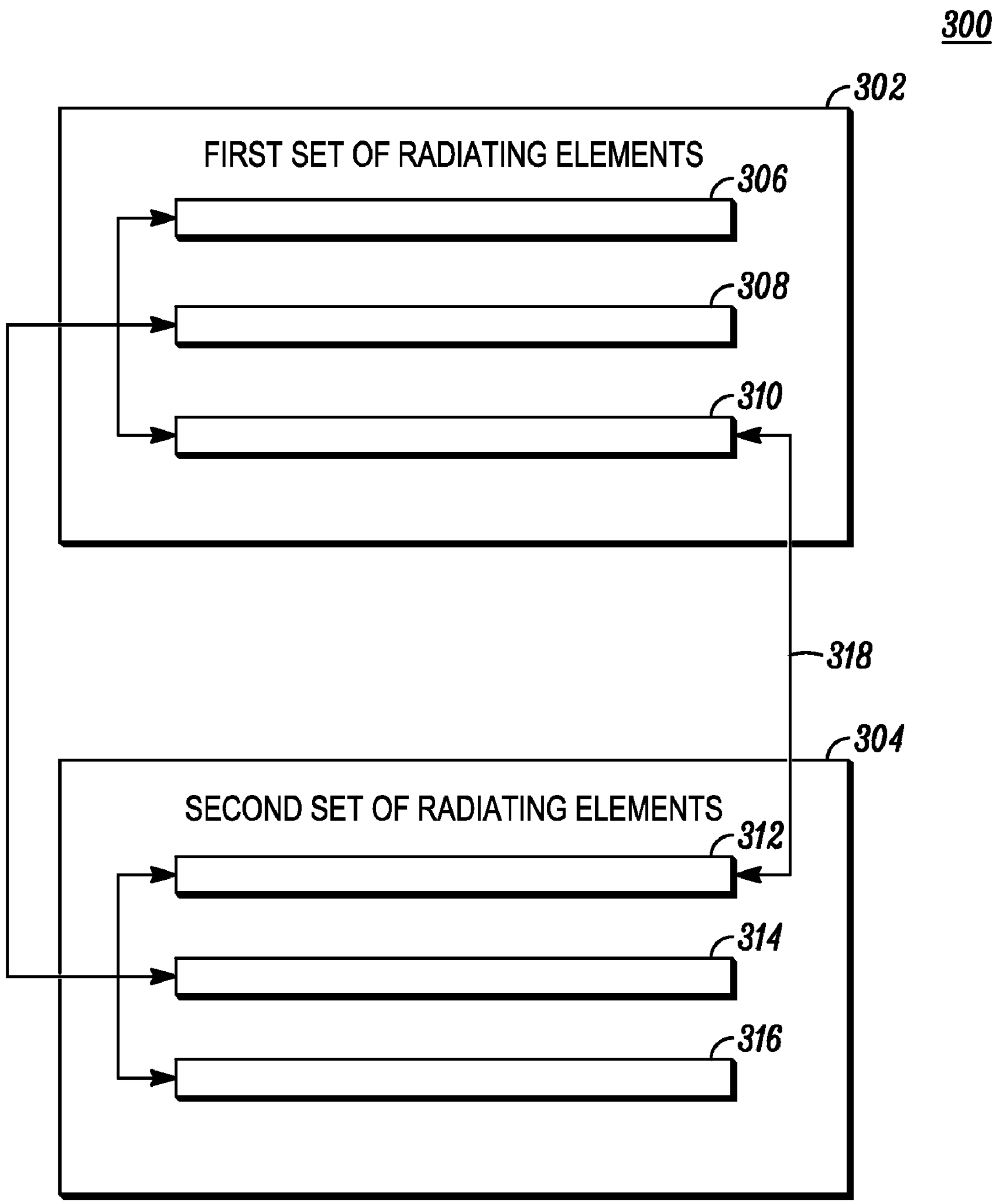
FIG. 3 is a block diagram illustrating an antenna for sending and receiving signals in a plurality of frequency bands, in accordance with a first exemplary embodiment of the present invention.

FIG. 3 illustrates a block diagram of an antenna for sending and receiving signals in a plurality of frequency bands, in accordance with a first exemplary embodiment. An antenna 300 includes a first set of radiating elements 302 and a second set of radiating elements 304. The first set of radiating elements 302 and the second set of radiating elements 304 are connected together. The first set of radiating elements 302 is utilized for generating resonances in a first frequency band and the second set of radiating elements 304 is utilized for generating resonances in a second frequency band.

The first set of radiating elements 302 includes a first radiating element 306, a second radiating element 308, and a third radiating element 310. Similarly, the second set of radiating elements 304 includes a fourth radiating element 312, a fifth radiating element 314, and a sixth radiating element 316.

In an embodiment, at least one resonance is generated in a loop, formed due to a capacitive coupling 318 between two radiating elements at a desired frequency, one each from the first set of radiating elements 302 and the second set of radiating elements 304. For example, a resonance is generated in the loop, formed due to the capacitive coupling 318 between the third radiating element 310 and the fourth radiating element 312.

In an embodiment, the radiating elements are designed in accordance with the first and the second frequency bands that are determined by, for example, GSM/UMTS. Further, the sizes of the radiating elements can be varied, to generate the different frequency bands.

Figure 4:
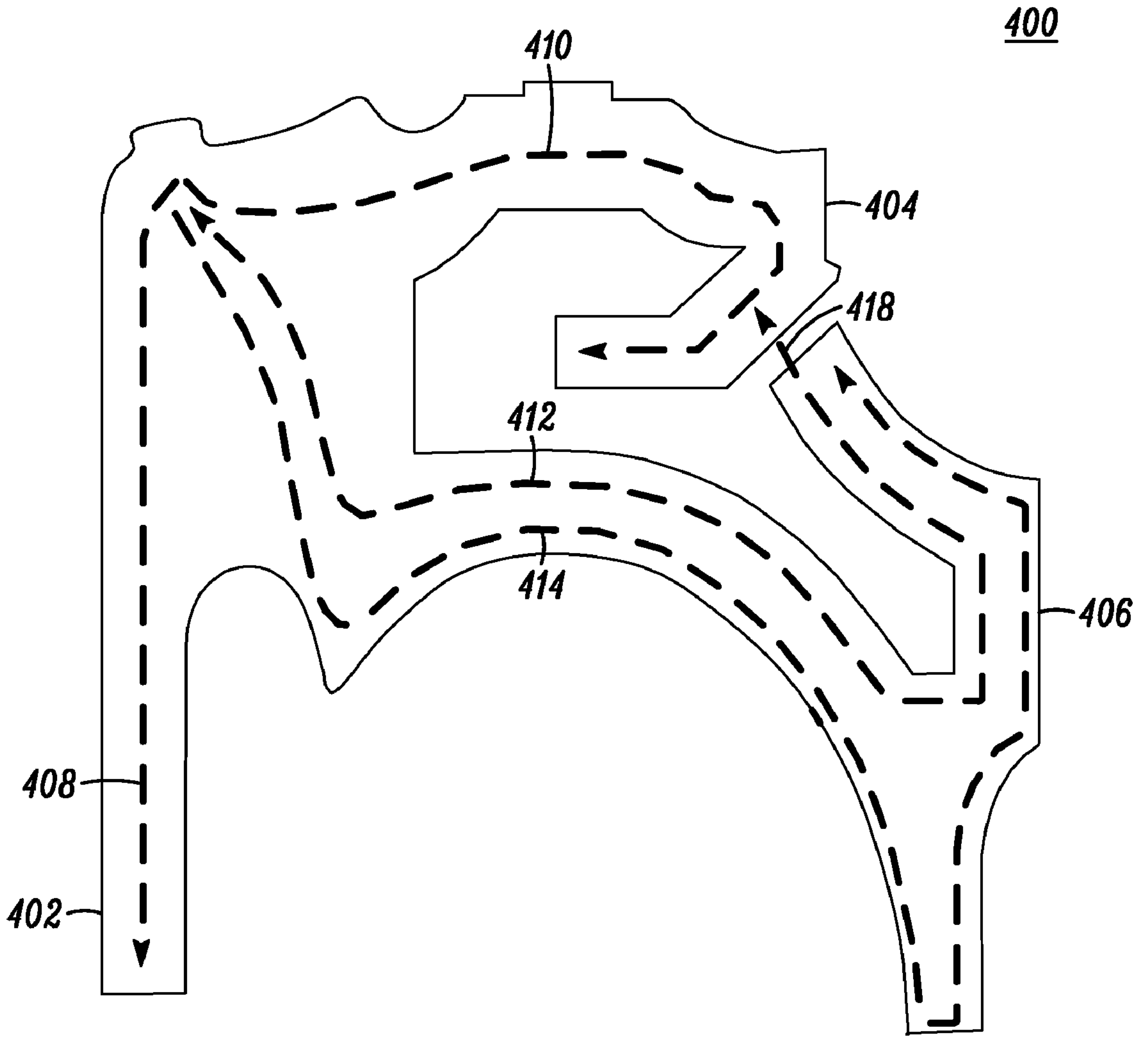
FIG. 4 is a schematic diagram illustrating an antenna for sending and receiving signals in a plurality of frequency bands, in accordance with a second exemplary embodiment of the present invention.

FIG. 4 illustrates a schematic diagram of an antenna 400 for sending and receiving signals in a plurality of frequency bands, in accordance with a second exemplary embodiment. The antenna 400 includes a first radiating element 402, a second radiating element 404 coupled to the first radiating element 402, and a third radiating element 406 coupled to the first radiating element 402. The first radiating element 402 is utilized for generating a first resonance in a first frequency band. The second radiating element 404 extends at an angle from the first radiating element 402 and has a curved structure. The second radiating element 404 is utilized for generating a second resonance in the first frequency band.

The third radiating element 406 extends at an angle from the first radiating element 402 and has a curved structure. The second radiating element 404 and the third radiating element 406 are capacitively coupled to form a loop to generate a third resonance in the first frequency band. The third radiating element 406 is also utilized for generating a fourth resonance in a second frequency band independent of the loop at the second frequency band.

In an embodiment, the loop formed due to a capacitive coupling 418 has an intervening slot between the second radiating element 404 and the third radiating element 406. The intervening slot provides coupling at the first frequency band but not the second frequency band. Modifying the slot dimensions may shift the first and second resonant frequencies associated with the loop structure. Modifying the length of the radiating elements would not only shift the resonant frequencies associated with each element independently but also the resonances associated with the loop.

In FIG. 4, resonant structures 408, 410, and 412 (depicted by dotted lines) constitute the radiating elements 402, 404 and 406, respectively, and generate resonance in the first frequency band. One of the resonances in the first frequency band is generated by a closed loop, due to the capacitive coupling 418, formed with the resonant structures 410 and 412. Similarly, the resonant structure 414 is the resonant structure in the second frequency band and is depicted by a dotted line.

The resonant frequency, generated by the closed loop, depends on the extent of the capacitive coupling between the resonant structures 410, 412 provided by the slot 418. The right side of equation (1), shows the impedance around the loop, which depends on the inductances of the loop elements $L_B$ and $L_C$ (resonant structures 410 and 412) and their coupling capacitances noted by C.

$$j\omega L_E = j\omega L_B + j\omega L_C - j/C\omega \quad (1)$$

On the left side, $L_E$ denotes an equivalent and hypothetical loop made up of only inductance that would resonate at the same frequency as the actual loop does. ω is the frequency in radians (given by: $\omega=2\pi f$, where f is the frequency in Hertz). Solving equation 1, $L_E$ may be computed as:

$$L_E = L_B + L_C - 1/C\omega^2 \quad (2)$$

The necessary condition for the loop to exist and resonate is that the value of $L_E$ is greater than zero, which implies that $$L_B+L_C>1/C\omega^2 \quad (3)$$

For the negative values of $L_E$, the inductance associated with the loop becomes negative, and is therefore unrealizable. Meaning that, the loop is open and elements 410 and 412 are not coupled.

The term $1/C\omega^2$ in equation 3 is a function of the capacitance of the loop and its frequency. For a given capacitance, the magnitude of this term, for frequencies ranging from 800-900 MHz, is approximately four times the magnitude of this term for frequencies ranging from 1800-1900 MHz, since the frequency is raised approximately by a power of two. As a result, it is possible to create a loop with a certain capacitance, so that for the first frequency band the value of $L_E$ becomes positive, and for the second frequency band it becomes negative. In this condition, for the first frequency band, the combination of $L_B$, $L_C$ and C produce a positive $L_E$ with a resonating loop, and for the second frequency band, the loop remains open and allows the resonant structure 412 to resonate independently from the rest of the resonant structures.

As the impedance transforms around the loop, in order to avoid the possibility of the loop enforcing two conflicting impedances at a feed point, the electrical length, $l_{L_E}$, of the loop, which comprises of all loop elements 410, 412 and 418 is restricted by:

$$l_{L_E}=\lambda_1/2 \quad (4)$$

where $\lambda_1$ is the wavelength of the signal in the first frequency band.

The optimum electrical length of the loop set by $l_{L_E}$, ensures that all the resonant structures work together in harmony and resonate side by side without disturbing each other. When equation (4) does not hold, the imposed impedance at the feed point may disturb the operation of resonant structures that generate other resonances. The disturbance arises as a result of a new distribution of voltages and currents on the resonant structures composing the loop.

The aforementioned constraints may be summarized by the following equations:

$$L_E=L_B+L_C-1/C\omega_1^2>0 \text{ for the first frequency band;} \quad (5)$$

$$L_E=L_B+L_C-1/C\omega_2^2<0 \text{ for the second frequency band; and} \quad (6)$$

$$l_{L_E}=\lambda_1/2 \quad (7)$$

where $\omega_1$ is the frequency in the first frequency band in radians and $\omega_2$ is the frequency in the second frequency band in radians. The frequency in the first frequency band is higher than that in the second frequency band. The resonant structures are designed, based on the design constraints mentioned above.

The resonant structures are generating distinct resonances in the first and second frequency bands, for transmission and reception of signals. It should be noted that the frequency of the resonances generated by these resonant structures may be increased or decreased by increasing or decreasing the dimensions, i.e., size, length, or thickness, of these resonant structures. Further, it should also be noted that reducing or increasing the capacitive coupling 418 between the resonant structures 410 and 412 might shift the frequency of a resonance in the first frequency band. The variance in capacitive coupling is carried out by increasing or decreasing the intervening slot dimensions between the second radiating element 404 and the third radiating element 406.

While the principles of the invention have been described above in connection with a specific system, it is to be clearly understood that this description is made only by way of example and not as a limitation on the scope of the invention.

Figure 5:
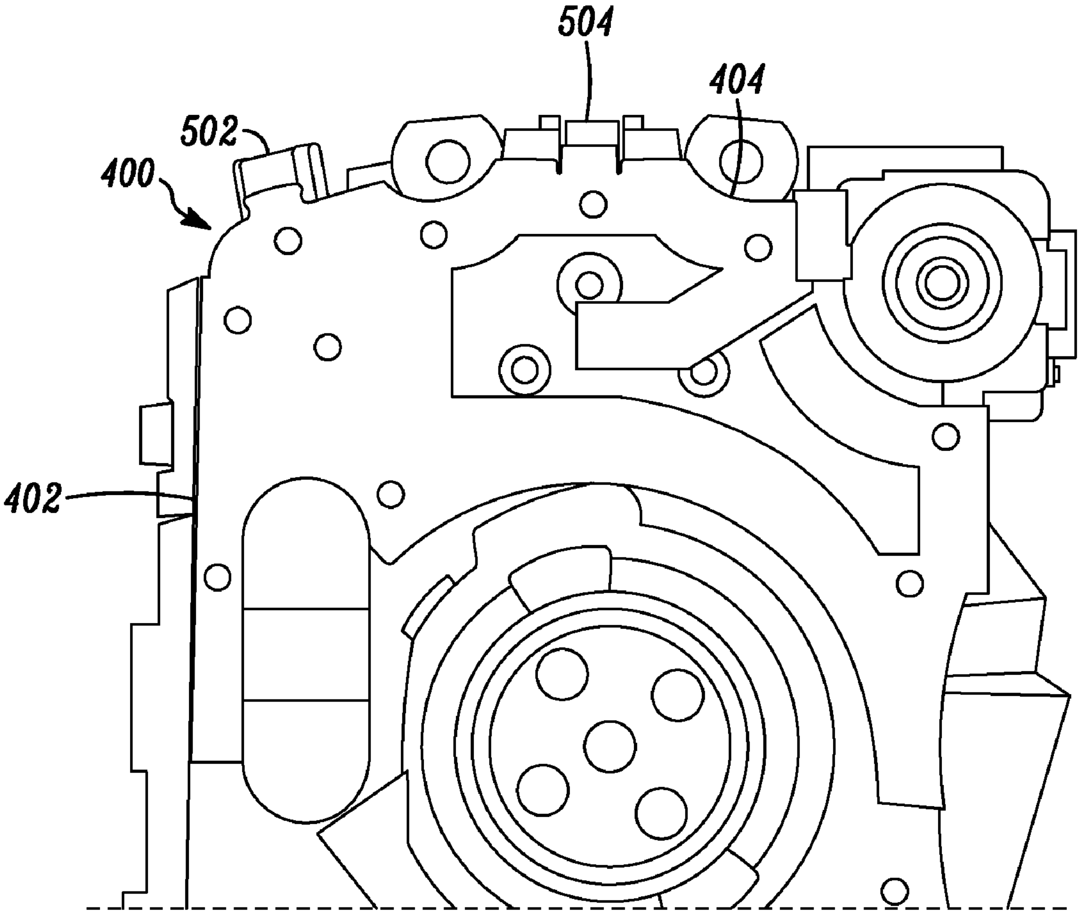
FIG. 5 is a schematic diagram illustrating an antenna for sending and receiving signals in a plurality of frequency bands incorporated into part of a wireless communication device, in accordance with a third exemplary embodiment of the present invention.

FIG. 5 illustrates a schematic diagram for an antenna for sending and receiving signals in a plurality of frequency bands, in accordance with a third exemplary embodiment. FIG. 5 depicts the antenna 400 in FIG. 4 placed internally in the body of a mobile phone. The first radiating element 402 of the antenna 400 is connected to a feed leg 502, and the second radiating element 404 is connected to a ground leg 504.

The feed leg 502 is utilized to provide the feed signal to the antenna 400, while the ground leg 504 is utilized for connecting the antenna 400 to ground potential.

Figure 6:
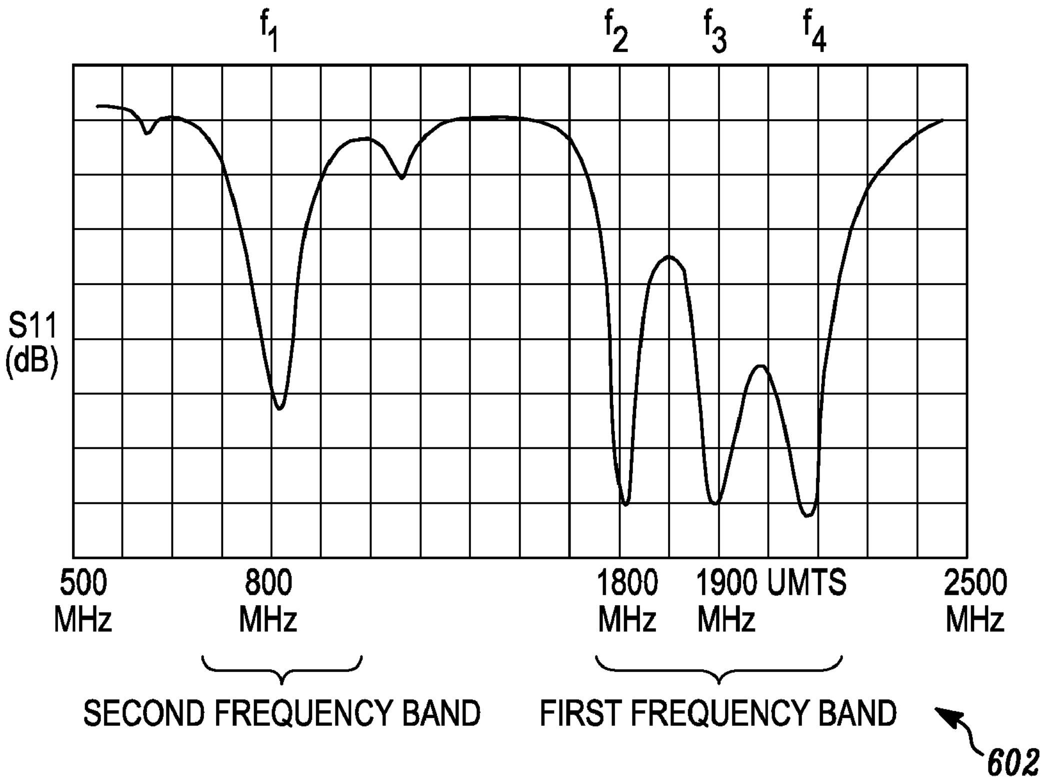
FIG. 6 is a Return Loss (S11) plot and Smith Chart of the antenna in FIG. 4, illustrating its coverage of a plurality of frequency bands.
Figure 6:
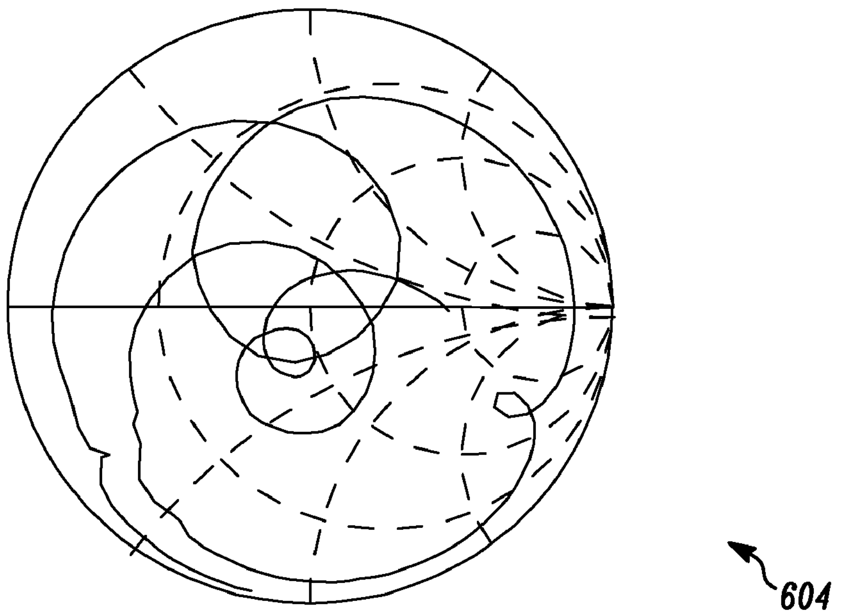

FIG. 6 depicts a Return Loss (S11) plot and Smith Chart of the antenna 400 in FIG. 4. The S11 plot and Smith chart depict the coverage of the antenna 400 in a plurality of frequency bands. In a Return Loss plot 602, three distinct resonances are obtained at frequencies $f_2$, $f_3$, and $f_4$, which lie in the first frequency band. Similarly, a resonance is obtained at frequency $f_1$, which lies in the second frequency band. Frequency $f_1$ is at 800 MHz for low-frequency GSM band or AMPS communications. Frequency $f_2$ is at 1800 MHz for high-frequency GSM band communications in Europe. Frequency $f_3$ is at 1900 MHz for high-frequency GSM band and UMTS band communications in the United States. Frequency $f_4$ is at 2100 MHz for UMTS band communications in Europe and Japan.

The resonances in the first frequency band, and the resonance in the second frequency band enable transmission and reception of signals in the first and second frequency bands, respectively. A Smith chart 604 depicts the impedance of the antenna 400.

Figure 7:
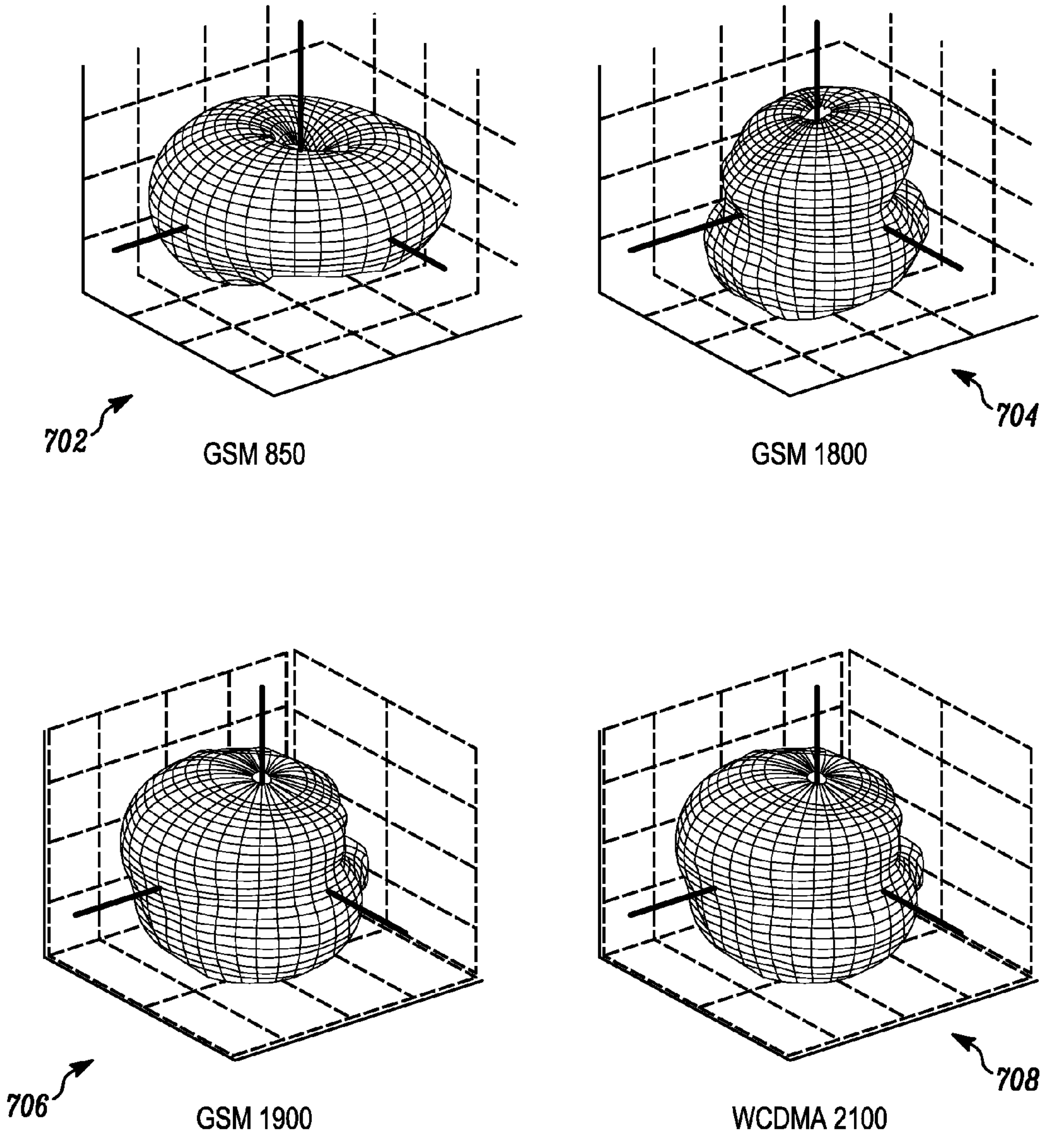
FIG. 7 is a three-dimensional illustration of the radiation patterns of the antenna in FIG. 4, in different frequency bands.

FIG. 7 depicts a three-dimensional illustration of the radiation patterns of the antenna 400 in FIG. 4 in different frequency bands. A radiation pattern of the antenna 400 in a GSM band around 850 MHz is depicted in a radiation pattern 702. Similarly, radiation patterns for the antenna 400 in a GSM band around 1800 MHz, a GSM band around 1900 MHz, and a Wideband Code Division Multiple Access (WCDMA) band around 2100 MHz band are depicted in radiation patterns 704, 706, and 708, respectively.

Figure 8:
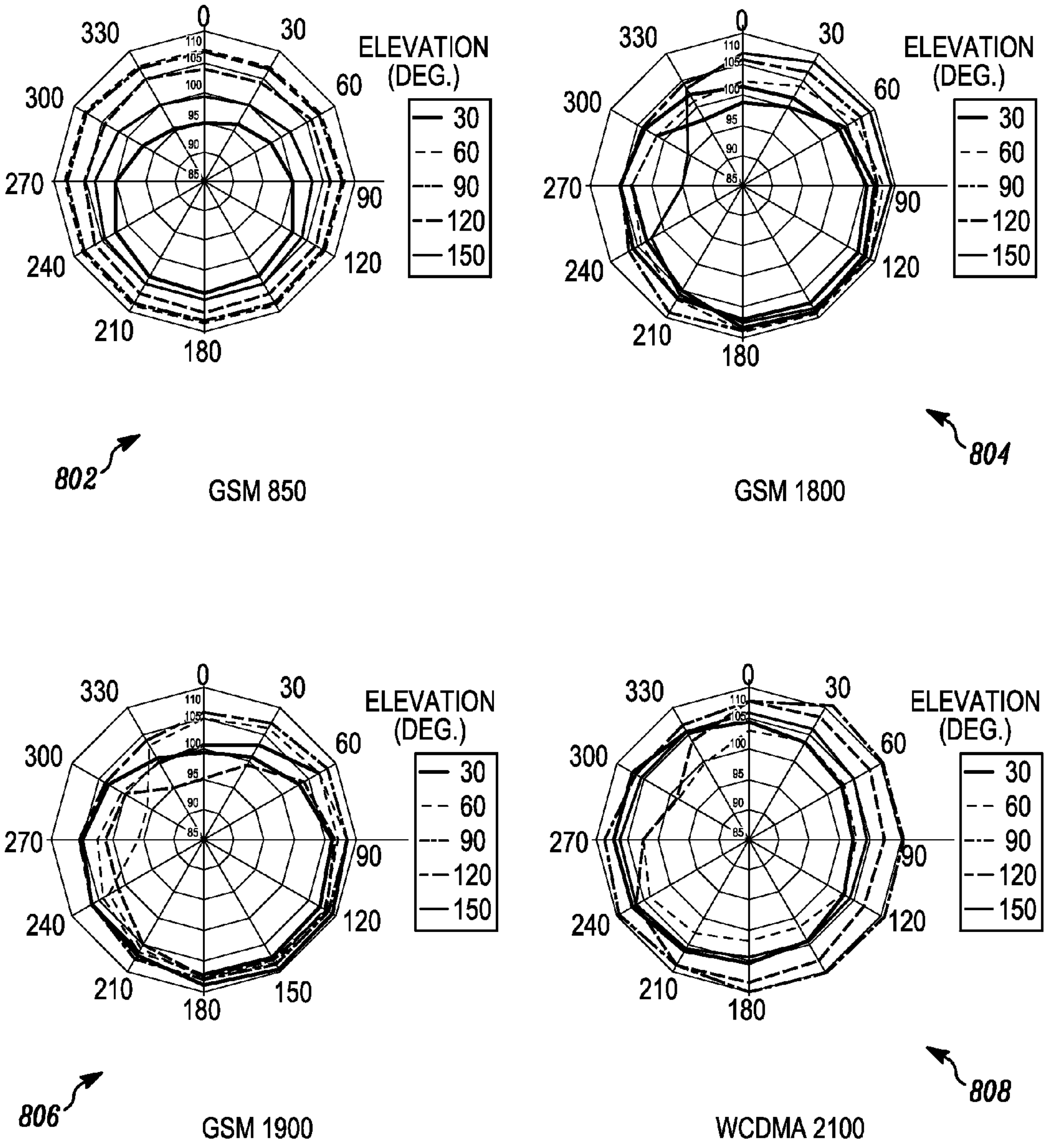
FIG. 8 is a schematic representation of antenna gains of the antenna in FIG. 4 in the receiving bands of different elevations.

FIG. 8 illustrates a schematic representation of antenna gains of the antenna 400 in FIG. 4 in the receive bands of different elevations. The antenna gains of different elevations in the receive band of a GSM 850 MHz band are depicted in a gain chart 802. Similarly, the antenna gains of different elevations in the receive bands of a GSM band around 1800 MHz, a GSM band around 1900 MHz, and a WCDMA band around 2100 MHz are depicted in gain charts 804, 806, and 808, respectively.

Figure 9:
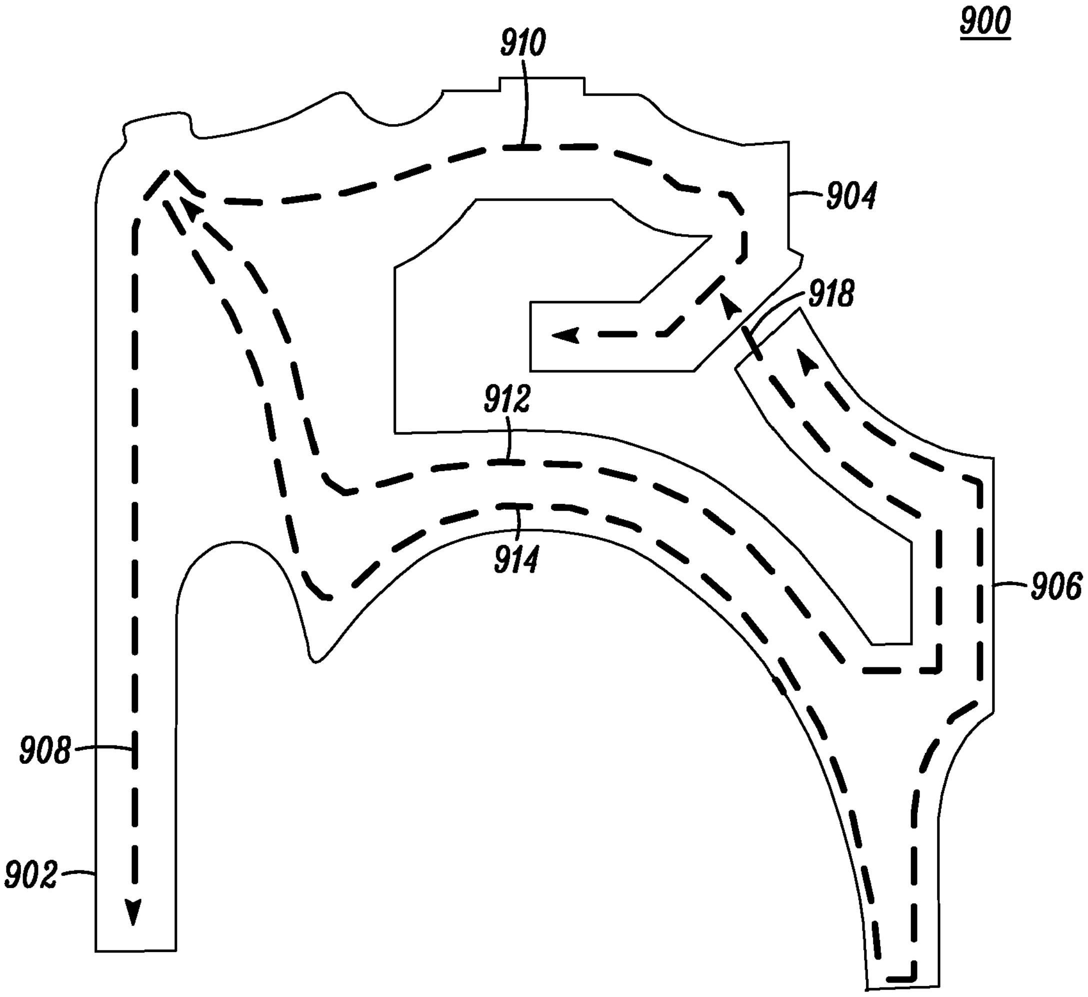
FIG. 9 is a schematic diagram illustrating an antenna for sending and receiving signals in a plurality of frequency bands, in accordance with a fourth exemplary embodiment of the present invention.

FIG. 9 illustrates a schematic diagram of an antenna 900 for sending and receiving signals in a plurality of frequency bands, in accordance with a fourth exemplary embodiment. The antenna 900 includes a first radiating element 902, a second radiating element 904 coupled to the first radiating element 902, and a third radiating element 906 coupled to the first radiating element 902. The first radiating element 902 is utilized for generating a first resonance in a first frequency band. The second radiating element 904 extends at an angle from the first radiating element 902 and has a curved structure. The second radiating element 904 is utilized for generating a second resonance in the first frequency band. The third radiating element 906 extends at an angle from the first radiating element 902 and has a curved structure. The second radiating element 904 and the third radiating element 906 are capacitively coupled to form a loop to generate a third resonance in the first frequency band. The third radiating element 906 is also utilized for generating a fourth resonance in a second frequency band independent of the loop at the second frequency band.

The various radiating elements of the antenna 900 are similar to the corresponding radiating elements of the antenna 400 in FIG. 4, except that the third radiating element 406 of the antenna 400 is quite different in shape as compared to the third radiating element 906 of the antenna 900. The different shape of the second third element 906 of the antenna 900 as compared to the third radiating element 406 of the antenna 400 enables the operation of the antenna 900 in the 900 MHz band instead of the 800 MHz band, without affecting resonances in the high bands, i.e., the GSM 1800 MHz/GSM 1900 MHz/UMTS bands. The shortening of the third radiating element 906 in FIG. 9, to achieve 900 MHz resonance instead of 800 MHz, does not affect the loop resonance significantly. This is due to the fact that the currents in the first frequency band do not flow that far up on element 906 and turn towards slot 918 on the first corner.

In an embodiment, the loop formed due to a capacitive coupling 918 has an intervening slot between the second radiating element 904 and the third radiating element 906. The intervening slot provides coupling at the first frequency band but not the second frequency band. Modifying the slot dimensions may shift the first and second resonant frequencies associated with the loop structure. Modifying the length of the radiating elements would not only shift the resonant frequencies associated with each element independently but also the resonances associated with the loop.

In FIG. 9, resonant structures 908, 910, and 912 (depicted by dotted lines) constitute the radiating elements 902, 904 and 906, respectively, and generate resonance in the first frequency band. One of the resonances in the first frequency band is generated by a closed loop, due to the capacitive coupling 918, formed with the resonant structures 910 and 912. Similarly, the resonant structure 914 is the resonant structure in the second frequency band and is depicted by a dotted line. The resonant structures are designed based on the design constraints mentioned earlier.

Figure 10:
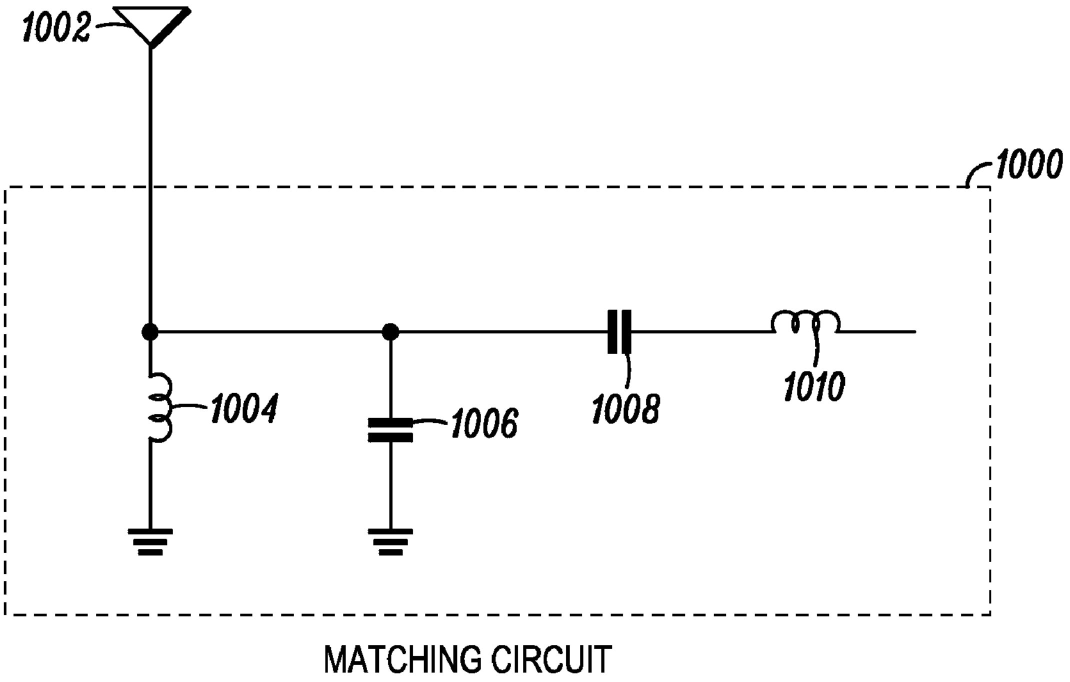
FIG. 10 is a schematic diagram depicting a matching circuit, in accordance with the first and second embodiments of the present invention.

FIG. 10 illustrates a schematic diagram of a matching circuit 1000, in accordance with an exemplary embodiment. The matching circuit 1000 is connected to an antenna 1002 and a reference voltage such as the ground, and is utilized for the independent tuning of each frequency band. The matching circuit 1000 includes a first inductor 1004, a first capacitor 1006, a second capacitor 1008, and a second inductor 1010. The antenna 1002 may have a structure similar to the antenna 300 in an embodiment. In another embodiment, the antenna 1002 can have a structure similar to the antenna 400 in FIG. 4. In addition, the antenna 1002 may have a structure similar to the antenna 900 shown in FIG. 9.

The first inductor 1004 has a first terminal connected to the antenna 1002, and a second terminal connected to the ground. The first capacitor 1006 has a first terminal connected to the antenna 1002 and a second terminal connected to ground. The second capacitor 1008 has a first terminal connected to the antenna 1002 and a second terminal. The second inductor 1010 has a first terminal connected to the second terminal of the second capacitor 1008 and a second terminal. The second terminal of the second inductor 1010 is connected to an internal circuit of a mobile phone that is utilized for sending and receiving signals through the wireless medium.

The first inductor 1004, along with the second capacitor 1008, rotates the impedance of the low-frequency band in a Smith chart, without affecting the impedance in the high-frequency band significantly. See Smith Chart 604 in FIG. 6. Similarly, the first capacitor 1006, along with the second inductor 1010, rotates the impedance of the high-frequency band in the Smith chart, without significantly affecting the low-frequency band impedance.

In an embodiment, any other reference voltage other than the ground may be utilized. The first inductor 1004 and the second capacitor 1008 provide impedance matching in the second frequency band. Similarly, the first capacitor 1006 and the second inductor 1010 provide impedance matching in the first frequency band.

Therefore, it should be clear from the preceding disclosure that the present invention provides an apparatus and system of sending and receiving signals in a plurality of frequency bands. The apparatus and system advantageously enable transmission and reception of signals in a plurality of frequency bands. The frequency bands generated by the apparatus and system may be shifted in frequency, broadened, or narrowed down, depending on the requirement. The apparatus and system further advantageously allow communication in the UMTS band.

This antenna system does not produce anti-resonant frequencies that would increase antenna impedance and as a result produce high E-fields. This keeps the dissipation losses through the plastic, as the antenna support structure, at minimum levels.

This disclosure is intended to elaborate on how to fashion and use various embodiments, in accordance with the invention, rather than limit the true, intended, fair scope and spirit thereof. The foregoing description is not intended to be exhaustive or limit the invention to the precise forms disclosed. Modifications or variations are possible in light of the above teachings. The embodiment was chosen and described, to provide the best illustration of the principles of the invention and its practical application, to enable one with ordinary skill in the art to utilize the invention in various embodiments and with various modifications, as are suited to the particular use contemplated. All such modifications and variations are within the scope of the invention, as determined by the appended claims, which may be amended during the pendency of this application for patent, and all equivalents thereof, when interpreted in accordance with the breadth to which they are fairly, legally and equitably entitled.

What is claimed is:

1. An antenna for sending and receiving signals in a plurality of frequency bands, the antenna generating a plurality of resonances for sending and receiving signals in the plurality of frequency bands, the antenna comprising:

a first radiating element for generating a first resonance in a first frequency band;

a second radiating element coupled to the first radiating element, the second radiating element extending at an angle therefrom, wherein the second radiating element generates a second resonance in the first frequency band; and a third radiating element coupled to the first radiating element, the third radiating element extending at an angle therefrom, wherein a capacitive coupling between the second radiating element and the third radiating element generates a loop with a third resonance in the first frequency band, and the third radiating element generates a fourth resonance in a second frequency band.

2. The antenna of claim 1, wherein the second radiating element has a curved structure.

3. The antenna of claim 1, wherein the third radiating element has a curved structure.

4. The antenna of claim 1, wherein the loop has an intervening slot in between the second radiating element and the third radiating element.

5. The antenna of claim 1, wherein the first radiating element is connected to a feed leg.

6. The antenna of claim 1, wherein the second radiating element is connected to a ground leg.

7. The antenna of claim 1, wherein at least one of the plurality of frequency bands are shifted by modifying at least one dimension of at least one of the plurality of radiating elements.

8. The antenna of claim 1, wherein the first frequency band comprises a high frequency GSM band.

9. The antenna of claim 1, wherein the first frequency band comprises a UMTS band.

10. The antenna of claim 1, wherein the second frequency band comprises a low frequency GSM band.

11. The antenna of claim 1, wherein the second frequency band comprises an AMPS band.

12. The antenna of claim 1 further comprising a matching circuit for independent tuning of each of the plurality of frequency bands, the matching circuit connected to the antenna and a reference voltage, the matching circuit comprising:

a first inductor having a first terminal connected to the antenna and a second terminal connected to the reference voltage;

a first capacitor having a first terminal connected to the antenna and a second terminal connected to the reference voltage;

a second capacitor having a first terminal connected to the antenna and a second terminal; and a second inductor having a first terminal connected to the second terminal of the second capacitor and a second terminal.

13. The antenna of claim 12, wherein the reference voltage is ground.

14. The antenna of claim 12, wherein the first inductor and the second capacitor provide impedance matching in the second frequency band.

15. The antenna of claim 12, wherein the first capacitor and the second inductor provide impedance matching in the first frequency band.

* * * * *